US012798204B2

(12) United States Patent
Jacobs et al.

(10) Patent No.: US 12,798,204 B2
(45) Date of Patent: Nov. 17, 2026

(54) SYSTEM AND METHOD FOR COMPOSITE PANEL FINISHING

(71) Applicant: Textron Aviation Inc., Wichita, KS (US)

(72) Inventors: Brian Keith Jacobs, Wichita, KS (US); Patrick Allen Stanton, Rose Hill, KS (US); Gregory Culbertson, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 19/042,094

(22) Filed: Jan. 31, 2025

(65) Prior Publication Data

US 2026/0225333 A1 Aug. 6, 2026

(51) Int. Cl.

| | |
|---|---|
| ***B29C 71/00*** | (2006.01) |
| ***B05D 1/28*** | (2006.01) |
| ***B05D 3/06*** | (2006.01) |
| ***B05D 3/12*** | (2006.01) |
| *B05C 1/08* | (2006.01) |

(52) U.S. Cl.

CPC ................ *B29C 71/00* (2013.01); *B05D 1/28* (2013.01); *B05D 3/067* (2013.01); *B05D 3/12* (2013.01); *B05C 1/08* (2013.01)

(58) Field of Classification Search

CPC .................................... B05D 1/28; B05D 3/12

See application file for complete search history.

(56) References Cited

U.S. PATENT DOCUMENTS

| | | | | |
|---|---|---|---|---|
| 4,563,321 A * | 1/1986 | Gessford | B29C 70/30 | 264/255 |
| 11,766,856 B2 * | 9/2023 | Franck, III | B32B 27/38 | 428/500 |
| 2008/0124576 A1 * | 5/2008 | Elliott | C08J 5/244 | 522/83 |
| 2015/0086772 A1 * | 3/2015 | Reed | B05D 7/06 | 428/308.8 |
| 2015/0217322 A1 * | 8/2015 | Rooijmans | B05C 1/08 | 118/200 |
| 2015/0369749 A1 * | 12/2015 | Safai | G01N 21/894 | 356/369 |
| 2018/0127613 A1 * | 5/2018 | Fuhr | C09D 15/00 | |
| 2019/0284819 A1 * | 9/2019 | Pervan | B41M 7/0045 | |

FOREIGN PATENT DOCUMENTS

| | | | | |
|---|---|---|---|---|
| CN | 102416715 A * | 4/2012 | | |
| EP | 0143753 A2 * | 6/1985 | B24B 41/002 | |

* cited by examiner

*Primary Examiner* — Cachet I Proctor

(74) *Attorney, Agent, or Firm* — Hovey Williams LLP

(57) ABSTRACT

A system and method for finishing a composite panel having undesired pores formed therethrough. A sander receives and scuffs up one or more surfaces of the composite panel and a roller receives liquid UV sealant from a source of UV sealant and rolls the UV sealant onto at least one surface of the composite panel, such that the UV sealant at least partially fills the pores. Then, a curing apparatus cures the UV sealant applied to the composite panel. The sanding, UV application, and curing steps may be performed once or numerous times depending on how many layers are needed to sufficiently smooth out surfaces of the composite panel such that the pores are no longer detectable, and the finished surfaces of the composite panel are ready for painting or other post-finishing processes/subsequent decorative applications.

11 Claims, 3 Drawing Sheets

SYSTEM AND METHOD FOR COMPOSITE PANEL FINISHING

BACKGROUND OF THE INVENTION

Weight considerations are particularly relevant to the art of aircraft manufacturing, because aircrafts function more efficiently and require less fuel when lighter weight. Using composite materials in furniture manufacturing in the aircraft interior design space is beneficial due to its strength and light weight properties. Such components may be made of flat composite sheet stock. High-pressure laminate can be used to laminate outer surfaces of the flat composite sheet stock. Alternatively, an outer surface of the flat composite sheet stock can be painted to provide a desired color and texture, or covered with a thin, self-adhesive decorative surface film, saving weight over the laminate methods. However, getting the surface of these composite panels smooth enough to achieve a similar look after being painted as when using the high-pressure laminate technique is a labor-intensive process.

For example, porosity filling and irregular surface conditioning to smooth the flat composite sheet stock in preparation for such painting generally includes hand application of water-based pore fillers and sprayable primers, and multiple sanding steps to create the correct surface condition for subsequent decorative applications. This process is performed on individual component parts of various thickness, size and shape, and are labor intensive and a time/schedule consuming processes.

Thus, there is a need for a composite sheet stock finishing method that overcomes the deficiencies of the prior art.

SUMMARY OF THE INVENTION

Embodiments of the current invention address one or more of the above-mentioned problems and provide a distinct advance in the art of composite finishing. Specifically, systems and methods herein fill porosity and irregular surfaces on flat composite panels using ultraviolet (UV) curable sealer, eliminating hours of hand application of fillers and primers to achieve as good or better results compared to the prior art.

In one embodiment, a system for finishing a composite panel with a plurality of irregularities formed into or through at least one surface of the composite panel includes a sander (e.g., an automated sander), a source of UV sealant, a roller, and a curing apparatus. The sander may receive and scuff up a surface of the composite panel, and the roller may receive UV sealant from the source of UV sealant and roll the UV sealant onto the surface of the composite panel. The curing apparatus may cure the UV sealant applied to the surface of the composite panel.

In another embodiment, a method of finishing a composite panel having a plurality of irregularities formed therein or therethrough includes the steps of sanding a surface of the composite panel with a sanding machine, applying a layer of liquid UV sealant onto the surface of the composite panel, and curing the UV sealant with a UV curing apparatus. Upon application, the liquid UV sealant fills the irregularities formed in or through the surface of the composite panel.

In yet another embodiment, a method of finishing a composite panel includes the steps of applying fiberglass resin across open cells of a honeycomb core on opposing surfaces of the honeycomb core and curing the fiberglass resin to form fiberglass skins bonded to the opposing surfaces of the honeycomb core. The applying and curing of the fiberglass resin on the honeycomb core forms the composite panel, and each of the fiberglass skins comprise pores or pin holes formed during the curing of the fiberglass resin. The method may further include sanding each of the fiberglass skins with a sanding machine, rolling a layer of liquid UV sealant with a roller or rollers onto each of the fiberglass skins such that the liquid UV sealant fills one or more of the pores or pin holes, and curing the UV sealant with a UV light source.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF DRAWINGS

Embodiments of the current invention are described in detail below with reference to the attached drawing figures, wherein.

Figure 1:
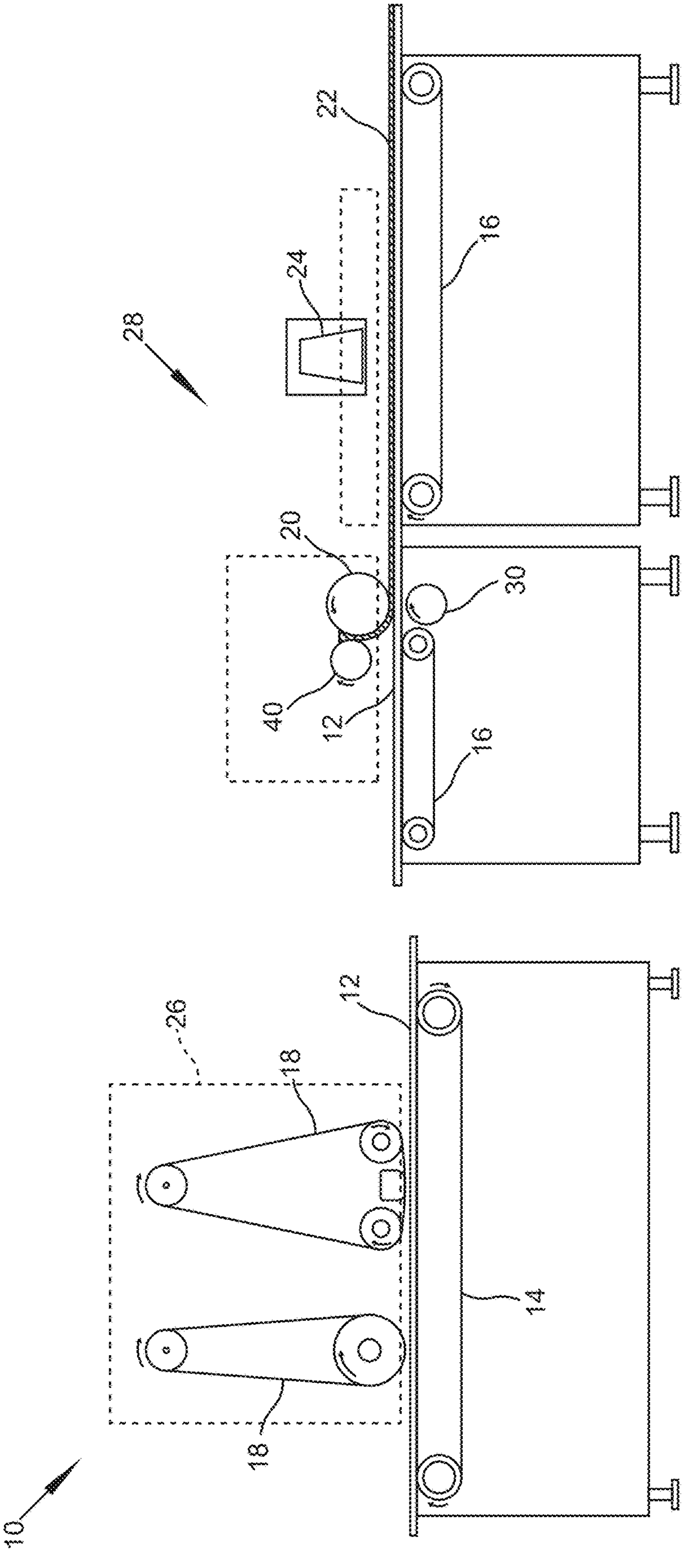
FIG. 1 is a system for finishing a composite panel in accordance with embodiments of the present disclosure.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE INVENTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized, and changes can be made without departing from the scope of the current invention. The following detailed description is, therefore, not to be taken in a limiting sense. The scope of the current invention is defined only by the appended claims, along with the full scope of equivalents to which such claims are entitled.

In one or more embodiments described herein, as depicted in FIG. 1, a system 10 and method for preparing a surface of a composite panel 12 is provided. Specifically, the system 10 may be configured for smoothing, filling porosity or other irregularities, sealing, leveling, and/or otherwise finishing the composite panel. The system 10 may include at least one conveyor 14,16, at least one sander 18 (e.g., an automated sander machine), at least one roller 20 for application of an ultraviolet (UV) sealant 22, a curing apparatus 24 configured for curing of the UV sealant 22, and, in some embodiments, a sealant source (not shown). Furthermore, in some embodiments, a sanding machine 26 may include the sander 18 and a UV machine may include the roller 20 and/or the curing apparatus 24, as well as other components described herein. However, in other embodiments, the sanding machine 26 and the UV machine 28 may all be part of a single machine or system (e.g., coupled via the at least one conveyor 14,16 such that the composite panel 12 is conveyed from the sander 18 to the roller 20) without departing from the scope of the technology described herein. In some embodiments, one or more controllers, processing elements, or processors may also be included in the system 10 and may be configured to control any of the actuatable components described herein or any of the settings described herein, and to additionally carry out one or more of the method steps described herein. However, the controllers, processing elements, or processors may be omitted without departing from the scope of the technology described herein.

Figure 2:
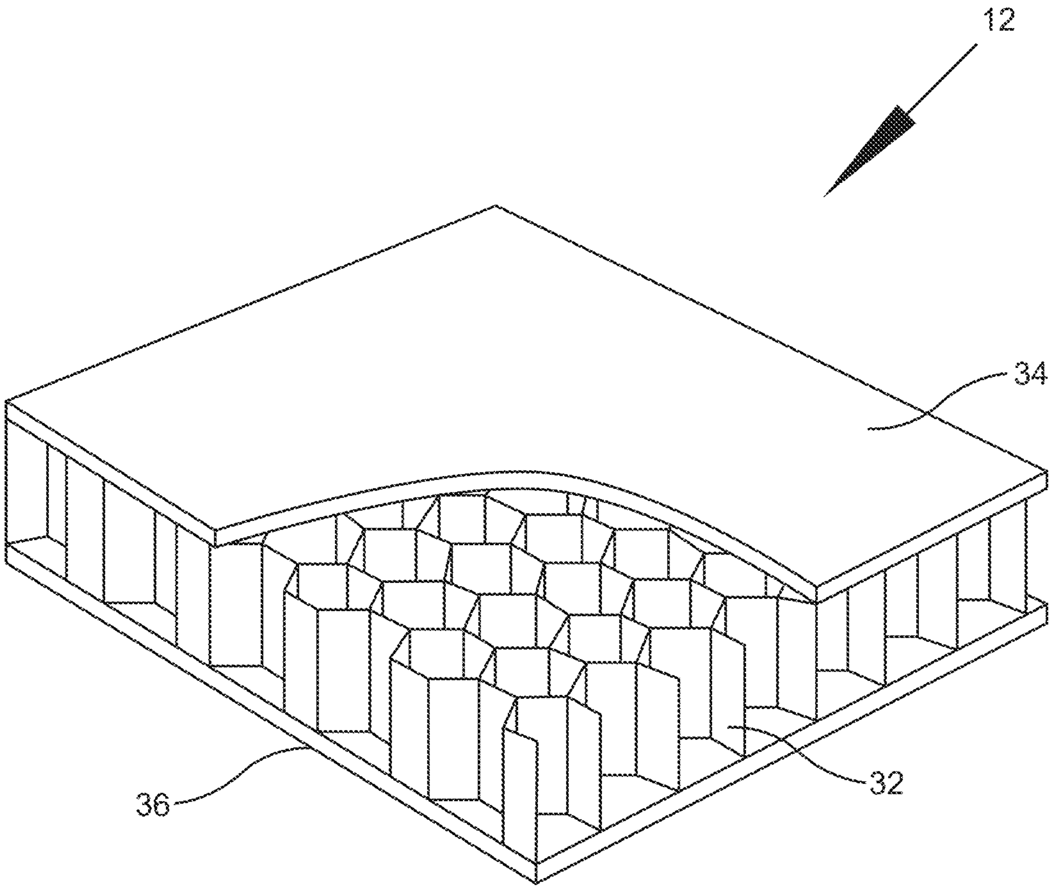
FIG. 2 is the composite panel of FIG. 1, in accordance with embodiments of the present disclosure.

As depicted in FIG. 2, the composite panel 12 may comprise a paper core 32 shaped to comprise a plurality of open cells (e.g., honeycomb cells of any cross-sectional closed shape such as a hexagon, circle, square, or the like) and having a fiberglass skin 34,36 bonded at a front surface and a back surface of the paper core 32. For example, the composite panel 12 may comprise a NOMEX honeycomb core material, made by DuPont de Nemours, Inc. of Wilmington, Delaware, with one or more layers of fiberglass skin bonded or adhered on opposing surfaces of the honeycomb core material. In one or more embodiments, manufacturing the composite panel 12 comprises forming paper core material (such as aramid fiber paper) into honeycomb or repeating hexagonal shapes and coating and bonding the paper together with a resin such as a phenolic resin. Thin fiberglass resin or other such suitable resins for composites is then applied over opposing sides of the paper core to create the composite panel, with the fiberglass resin solidifying to form fiberglass skins on the opposing surfaces of the paper core. Because the paper core comprises open cells all the way through, when the fiberglass resin is applied across openings of the open cells, pin holes, pores, and/or indents can form through or into portions of the fiberglass resin extending over and across the open cells. Specifically, any type of running of the fiberglass resin can create pores or pin holes through the fiberglass skin. This means that the fiberglass skin surface of the composite panel may have irregularities such as these pores, pin holes, or divots and therefore may not be smooth enough for various uses such as furniture, cabinetry, decorative paneling or the like inside aircrafts or for other structural or decorative purposes.

Thus, when such composite panels are used for decorative furniture, panels, or the like, and the weight of traditional laminate surfaces is undesirable, some additional processing and smoothing is required before paint is applied. Specifically, the composite panel 12 can be cut into pieces of varying sizes and/or shapes and then water-based epoxy, pore fillers (e.g., a spackling), or sprayable primers can be hand applied to either one or both opposing sides of the composite skin, followed by multiple sanding steps. The application of the pore fillers and subsequent sanding may also need to be performed again multiple times to fill up all of the pin holes and create a correct surface condition for subsequent decorative applications. However, these method steps of smoothing and finishing the composite panel's skins may be time consuming and require long time delays to allow these water-based filler materials to dry and cure. Thus, the system 10 and method described herein overcomes these deficiencies in finishing composite surfaces (e.g., the fiberglass skins). Specifically, the system 10 and the method described herein replaces hand application of water-based pore fillers with an automated application of the UV sealant 22, among other improvements as later described herein. Furthermore, the system 10 and the methods described herein are suitable for application and curing of the composite panel 12 with the UV sealant 22 applied thereto prior to cutting of individual parts. For example, a flat 4-foot by 8-foot sheet of the composite panel 12 can be processed as described herein with automated equipment and then later cut into 30 to 40 parts. This is advantageous over hand-application of pore filler and spray-applied epoxy on 30 to 40 different parts. Furthermore, the system 10 and methods described herein may be used on individual parts and advantageously result in a time savings due to drying time of pore fillers and additional primers.

The at least one conveyor 14,16 may, in some embodiments, include a sanding machine conveyor 14 configured for transporting the composite panel 12 through the sanding machine 26 and a UV machine conveyor 16 configured for transporting the composite panel 12 through the UV machine 28. However, any number of conveyors may be used without departing from the scope of the technology described herein. For example, a single conveyor belt, two conveyor belts, or any number of conveyor belts or conveyor systems operable to transport the composite panel 12 to and from the sander 18, the roller 20, and/or the curing apparatus 24 described herein may be used for the system 10 and methods described herein. As depicted in FIG. 1, the conveyor 16 may comprise two separate conveyors in some exemplary embodiments. Furthermore, in some embodiments, the conveyor or conveyors 14,16 may be actuated at a speed within a range of 10 meters per minute and 15 meters per minute. However other speeds may be used without departing from the scope of the technology described herein.

The sander 18 may be or may comprise, for example, a wide-belt sander, a drum sander, a robotic orbital sander, or the like used to sand the composite panel 12. In some embodiments, as depicted in FIG. 1, the sander 18 may comprise two sanding belts applying differing amounts of pressure, grit, or other sanding characteristics. However, other automated sander belts or sanding machines (e.g., rotary sanders or the like) may be used to sand the composite panel 12 without departing from the scope of the technology described herein. In one or more example embodiments, the wide-belt sander or any of the sanding machines described herein may be sufficiently wide to simultaneously sand all of a large sheet of composite material which may subsequently be cut and used to manufacture multiple composite parts. The sander 18 is configured to scuff up one or both opposing surfaces of the composite panel 12 (e.g., the fiberglass skins thereof). For example, the sander 18 may scuff up both sides of the composite panel 12 by the composite panel 12 being inserted with a first side facing up during a first pass and then a second side opposite the first side facing up during a second pass through the sander. Alternatively, the sander 18 may be configured to sand both sides of the composite panel 12 simultaneously or in series (one side and then the opposite side) in a single pass of the composite panel 12 through the sander 18. In one or more embodiments, the sander 18 may further be configured to clean the surface of the composite panel 12, removing dust and debris kicked up during the sanding or scuffing process. Thus, when the composite panel 12 exits the sander (e.g., via the first conveyor 14), it is prepared for application of the UV sealant 22. Specifically, the sanding or scuffing of the composite panel 12 gives some mechanical tooth to which the UV sealant 22 can stick. In some embodiments, the sander 18 may be configured such that the sanding can be accomplished in about 30-60 seconds. Shorter or longer sanding times can be used without departing from the scope of the technology described herein.

The roller 20 for application of the UV sealant 22 from the sealant source can comprise one or a plurality of rollers. For example, the roller 20 may comprise a wide roller having a width sufficient to span an entirety of a width of the composite panel 12. In some embodiments, the roller 20 may be made of a rigid and/or a resilient material, such as rubber, sponge material, or the like. In some embodiments, the roller 20 may be rotatably attached above at least one of the conveyors 14,16. The roller 20, in some embodiments, may be actuatable toward and/or away from the UV machine conveyor 16 in a manual or automated manner (e.g., via the UV machine). For example, when the roller 20 is actuated toward the UV machine conveyor 16 as the composite panel 12 is fed therebetween on the UV machine conveyor 16, the roller 20 may engage with the composite panel 12 to apply the UV sealant 22 onto the composite panel 12. As the composite panel 12 is conveyed by the UV machine conveyor 16, the movement of the composite panel 12 against the roller 20 rotates the roller 20. Additionally or alternatively, the roller 20 may be actuated via a motor or other actuators without departing from the scope of the technology described herein. For example, the roller 20 may be actuated to rotate at an identical or nearly identical speed as an actuator belt of the UV machine conveyor 16, evenly applying the UV sealant 22 to the composite panel. 12. In one or more embodiments, the UV machine conveyor 16 may additionally or alternatively comprise one or more feed rollers rotatably actuatable by a rotary motor, actuator, or the like, and the roller 20 may be located above, below, and/or in line with the feed rollers. For example, in some embodiments, the composite panel 12 may be conveyed between the feed rollers and the roller 20, with the roller 20 below the feed rollers.

In some embodiments, as depicted in FIG. 1 the roller 20 may be an application roller, and additionally a pressure roller 30 may be located below the application roller 20. The application roller 20 and the pressure roller 30 may rotate in opposite directions, such that the composite panel 12 and the UV sealant 22 are cooperatively actuated forward between the application roller 20 and the pressure roller 30. Furthermore, a doctor roller 40 may be located forward of the application roller 20 and may be configured to roll in an opposite direction than the application roller 20, such that the UV sealant 22 is fed downward onto the composite panel 12, as depicted in FIG. 1. However, other such configurations for application of the UV sealant 22 may be used without departing from the scope of the technology disclosed herein.

While the roller 20 may be configured to apply the UV sealant 22 to a single side or a single surface of the composite panel 12, the composite panel 12 may have both the first side and the second side of the composite panel 12 coated with the UV sealant 22 by performing a first pass with the first side facing the roller 20 and a second pass with the second side facing the roller 20. However, in one or more embodiments, the roller 20 may include multiple rollers such as a top roller and a bottom roller such that the UV sealant 22 is applied to both the first and second sides simultaneously or in sequence, one after the other, during a single pass through the UV machine. Furthermore, although application of the UV sealant 22 is described herein as being performed via the roller 20, other alternative methods of applying the UV sealant 22 may be used without departing from the scope of the technology herein.

The UV sealant 22 may be dispensed onto the roller 20 and/or the composite panel 12 via the sealant source, which may include one or more dispensing apparatuses for storing and dispensing the UV sealant 22 to the roller 20 for application thereof. For example, the sealant source may include a tank of liquid UV sealant through which the roller 20 rolls, or one or more nozzles, faucets, or the like may be positioned for dispensing the liquid UV sealant 22 onto a surface of the roller 20 (as in FIG. 1) and/or the composite panel 12. Alternatively, the liquid UV sealant 22 may be dispensed via any other liquid-dispensing techniques known in the art. For example, UV-activated sealers such as the UV sealant 22 can be sprayed on with a spray gun, curtain-coated via a curtain-coated machine, or can be roll-coated as described herein. The amount of the UV sealant 22 applied can be varied (e.g., put on thin or thick) via adjustments with the UV machine and/or the dispensing apparatuses thereof. The UV sealant 22 may be, for example, an acrylic and/or silicone UV cure adhesive and/or sealant applicable in liquid form and curable via the curing apparatus 24, as later described herein. Other UV sealants may be used without departing from the scope of the technology described herein.

The curing apparatus 24 configured for curing the UV sealant 22 may be a UV radiator lamp positioned and configured for curing the UV sealant 22 being applied to the composite panel 12. For example, in one or more embodiments, the heater may be or may comprise an ultra-high-powered UV lamp. The curing apparatus 24 may be located on the UV machine and may be positioned such that the UV machine conveyor 16 transports the composite panel 12 directly from the roller 20 to the curing apparatus 24. However, in one or more embodiments, the curing apparatus 24 may be located on a separate apparatus than the roller 20 without departing from the scope of the technology described herein. In one or more embodiments, the curing apparatus 24 may be a UV light source configured to output UV light at both the first and second sides of the composite panel 12, thus curing the UV sealant 22 on both the first and second sides simultaneously. Otherwise, multiple passes through the UV machine's roller 20 and curing apparatus 24 may be required in some embodiments to apply and cure the UV sealant 22 on both sides of the composite panel 12. The UV light output by the curing apparatus 24 for curing the UV sealant 22 may be adjustable by a user via a manual or digital control mechanism based on manufacturer specifications for the UV sealant 22 or other demands of the parts to be formed from the composite panel 12. Likewise, the wavelength range, power output, curing time, and size of the curing apparatus 24 may be designed to correspond to dimensions of the composite panel 12 and/or properties of the UV sealant 22 being applied thereto.

In use, the composite material 12 may be sanded via the sander 18 and/or the sanding machine described herein. Following such sanding, the composite panel 12 may be conveyed and/or otherwise placed into the UV machine for application and curing of the UV sealant 22 on one or both surfaces of the composite panel 12. Specifically, the UV machine first applies the UV sealant 22 with the roller 20. Then the curing apparatus 24 cures the UV sealant 22. Then, when the composite panel 12 comes out of the UV machine, it may be fully cured and ready to further sand and/or to have paint applied thereto to one or both sides of the composite panel 12 based on a desired use thereof. In some embodiments, such painting or other post-finishing processes may be performed much later than the composite panel finishing described herein. For example, after the processing steps described herein, the composite panel 12 may be placed into inventory for future use and then later machined (e.g., via a CNC router, multiple shaped parts may be formed out of the one composite panel 12). The paint can be applied before and/or after such cutting or machining of the composite panel 12.

Figure 3:
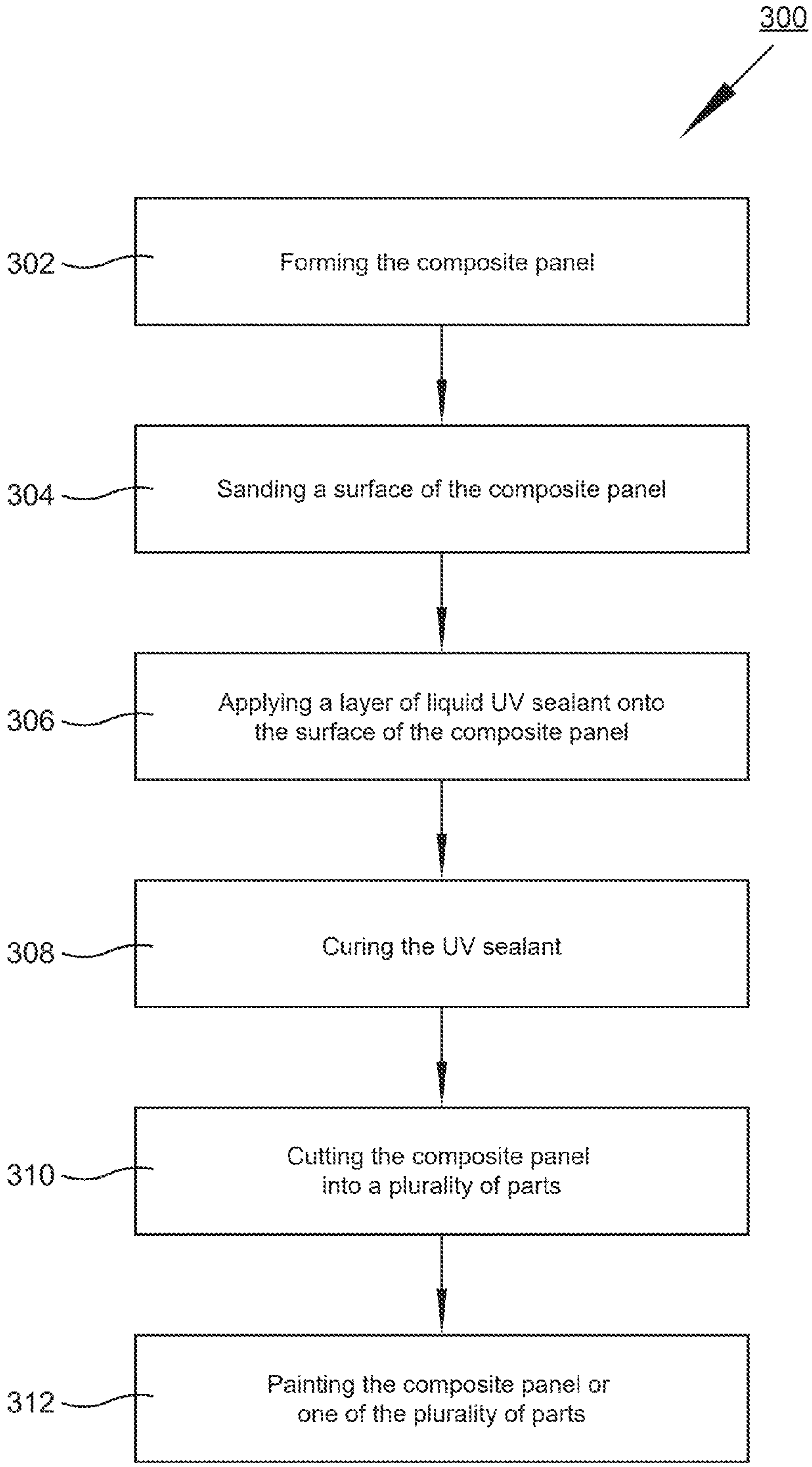
FIG. 3 is a method for finishing the composite part in accordance with one embodiment of the present disclosure.

The flow chart of FIG. 3 depicts the steps of an exemplary method 300 for preparing (e.g., filling and smoothing) irregular surfaces of composite panels using UV sealer in more detail. In some embodiments, various steps may be omitted, or steps may occur out of the order depicted in FIG. 3 without departing from the scope of the technology as described herein. For example, two blocks shown in succession in FIG. 3 may in fact be executed substantially concurrently, or blocks may sometimes be executed in the reverse order depending upon the functionality involved.

In some embodiments, the method 300 includes forming the composite panel 12, as depicted in block 302. For example, forming the composite panel 12 may include applying fiberglass resin across open cells of a honeycomb core (e.g., shaped and formed of paper) on opposing surfaces of the honeycomb core and curing the fiberglass resin to form fiberglass skins bonded to the opposing surfaces of the honeycomb core. This applying and curing of the fiberglass resin on the honeycomb core may thus form the composite panel 12. During this formation, at least one or each of the fiberglass skins may naturally have pores or pin holes that form therein or therethrough during the curing of the fiberglass resin. These pores or pin holes are examples of what is referred to herein as irregularities formed in and/or through surfaces of the composite panel 12.

The method 300 further includes a step of sanding at least one surface of the composite panel, as depicted in block 304, such as with the sanding machine 26. This sanding may include, for example, sanding each of the fiberglass skins with the sander 18 of the sanding machine 26. As noted above, the sanding machine 26 may sand both first and second opposing surfaces of the composite panel 12 simultaneously or in sequence during a single pass or may instead sand the first surface during a first pass of the composite panel 12 being conveyed therethrough and then sand the second surface during a second pass of the composite panel 12 being conveyed therethrough.

The method 300 also includes a step of applying a layer of liquid UV sealant onto the at least one surface of the composite panel, as depicted in block 306, such that the liquid UV sealant fills one, some, or all of the pores or pin holes. For example, this step may include rolling a layer of liquid UV sealant (e.g., the UV sealant 22) with at least one roller (e.g., the roller 20) onto each of the fiberglass skins (e.g., the first and second surfaces of the composite panel 12) such that the liquid UV sealant fills one or more of the pores or pin holes. As noted above, the UV machine 28 may apply the UV sealant 22 to both the first and second opposing surfaces of the composite panel 12 simultaneously or in sequence during a single pass, or may instead apply the UV sealant 22 to the first surface during a first pass of the composite panel 12 being conveyed therethrough and then apply the UV sealant 22 to the second surface during a second pass of the composite panel 12 being conveyed therethrough. The applying of the UV sealant 22 may include, in some embodiments, adjusting a flow amount or a flow rate of UV sealant 22 dispensed onto the roller 20 and/or the composite panel 12, in order to adjust a thickness of the UV sealant 22 applied to the composite panel 12. Different UV sealant thicknesses may be required for different applications.

The method 300 may also include a step of curing the UV sealant, as depicted in block 308, such as with the UV curing apparatus 24 (e.g., a UV light source). As with other embodiments described herein, the curing may be performed on the first surface of the second surface of the composite panel 12 during a single pass of the composite panel 12 through the UV machine 28 or may be performed on both of the first and second surfaces of the composite panel 12 simultaneously or in succession during a single pass of the composite panel 12 through the UV machine 28. Alternatively, the curing as depicted in block 308 may be performed on the first surface during a first pass of the composite panel 12 being conveyed therethrough and then performed on the second surface during a second pass of the composite panel 12 being conveyed therethrough.

So, in some embodiments, the sanding, applying, and curing steps can each be performed on both sides or both surfaces of the composite panel 12 during a single pass through the sanding machine 26 followed by a single pass through the UV machine 28. Alternatively, as described herein, the sanding, applying, and curing steps can be performed on a first surface of the composite panel 12, followed by a machine or a person turning the composite panel over and inserting the composite panel 12 through the sander 18 or sanding machine 26 again and then repeating the sanding, applying, and curing steps on the second surface of the composite panel 12. Additionally, or alternatively, multiple layers of the UV sealant 22 may be applied to one or both surfaces of the composite panel 12 via multiple passes through the UV machine 28. For example, the UV curing apparatus 24 may be set to only partially cure each layer during a plurality of passes of the composite panel 12 until a final pass when the UV curing apparatus 24 can be adjusted to fully cure a final layer of the UV sealant 22. In some embodiments, additional sanding of the cured UV sealant 22 may be performed by the sander 18 or another sander for additional processing purposes.

Finally, the method 300 may include cutting the composite panel into a plurality of parts, as depicted in block 310, and/or painting the composite panel or one or more of the plurality of parts, as depicted in block 312. For example, once the steps of blocks 302-308 are completed, the composite panel 12 can be stored in inventory for later use. Then, when needed to form one or more parts, the composite panel 12 may be pulled back out and cut into one or more shapes and/or one or more sizes for forming one or more composite parts, already having cured UV sealant filling all of the pores and pin holes or other irregularities formed therein. After the various parts are cut out of the composite panel 12, those parts can be individually painted as required for different components, allowing for customization of a plurality of composite parts. In some embodiments, following UV sealing, self-adhesive decorative films may be applied over the UV-sealed surface of the composite panel 12. In addition to painting and application of self-adhesive decorative films, other post-processing techniques may be applied to the cut or uncut UV-sealed composite panel 12 without departing from the scope of the technology described herein.

UV sealant is traditionally used as a top coating/decorative finish and not as a pore filler or primer. For example, wood is usually stained first, with UV sealant used as a topcoat. However, using UV sealant as a pore-filler under all of the top-coat products as described herein is novel over prior art finishing techniques. Furthermore, using the roller 20 as described herein advantageously squeezes the UV sealant 22 onto the composite panel 12 to force the UV sealant into the pores to fill them. Some composite panels are more porous than others and may require being ran three to four times or more through the system 10 or the machines 26,28 described herein to get enough UV sealant to seal up all the pores of the composite panel 12. As mentioned above, the curing apparatus 24 may operate at a temperature and for a time dependent on the application process, with adjustable UV light output (e.g., registered in millijoules). In some embodiments, the curing apparatus 24 may be set for a curing time and temperature or UV light output sufficient for partial curing of each coat applied thereto so each layer sticks well to the next, then the curing apparatus 24 may using an increased time, temperature, and/or UV light output on a final pass to fully cure a top layer of the UV sealant 22.

Advantageously, the methods described herein may take only a few minutes to finish the composite panel (e.g., to fill the pores formed in the skin thereof and provide a smooth surface for application of paint) as opposed to 2 to 8 hours using prior art composite finishing methods for filling pores formed therethrough. For example, the time previously spent waiting for water-soluble pore filler to cure is no longer needed, as the curing apparatus 24 with the UV lamp cures the UV sealant in seconds without the need for such long dry times and cure times.

OTHER CONSIDERATIONS

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor or a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processor", "processing element", or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A method of finishing a composite panel having a plurality of irregularities formed therein or therethrough, the method comprising:

sanding at least one surface of the composite panel with a sanding machine, wherein the composite panel comprises a paper honeycomb core and a fiberglass skin comprising the at least one surface, wherein the irregularities include a plurality of pores or pin holes formed through the fiberglass skin;

applying a layer of liquid UV sealant onto the at least one surface of the composite panel, prior to or in place of application of any water-based pore fillers, such that the liquid UV sealant fills one or more of the plurality of irregularities; and curing the UV sealant with a UV curing apparatus.

2. The method of claim 1, wherein the step of applying the layer of liquid UV sealant comprises conveying the composite panel through a UV machine while rolling the liquid UV sealant onto the at least one surface of the composite panel with a roller of the UV machine.

3. The method of claim 2, wherein the UV machine comprises the UV curing apparatus, wherein the UV curing apparatus comprises a UV light source or a UV lamp.

4. The method of claim 1, wherein the at least one surface of the composite panel comprises a first surface and a second surface opposite the first surface, wherein the sanding and the applying the layer of liquid UV sealant is performed on both the first surface and the second surface.

5. The method of claim 1, wherein the sanding machine comprises an automated sander configured for automated sanding of the at least one surface of the composite panel.

6. The method of claim 5, wherein the sanding includes conveying the composite panel with at least one conveyor through the sanding machine while sanding the composite panel with the automated sander.

7. The method of claim 1, further comprising cutting the composite panel into one or more shapes and sizes for forming one or more composite parts after curing the UV sealant.

8. The method of claim 1, further comprising painting the composite panel after curing the UV sealant.

9. The method of claim 1, wherein the sanding, applying, and curing steps are performed on a first surface of the at least one surface of the composite panel, wherein the method further comprises turning the composite panel over and repeating the sanding, applying, and curing steps on a second surface of the at least one surface of the composite panel.

10. A method of finishing a composite panel, the method comprising:

applying fiberglass resin across open cells of a honeycomb core on opposing surfaces of the honeycomb core;

curing the fiberglass resin to form fiberglass skins bonded to the opposing surfaces of the honeycomb core, wherein the applying and curing of the fiberglass resin on the honeycomb core forms the composite panel, wherein each of the fiberglass skins comprises pores or pin holes formed during the curing of the fiberglass resin;

sanding each of the fiberglass skins with a sanding machine;

rolling a layer of liquid UV sealant with at least one roller onto each of the fiberglass skins, prior to or in place of application of any water-based pore fillers, such that the liquid UV sealant fills one or more of the pores or pin holes; and curing the UV sealant with a UV light source.

11. The method of claim 10, further comprising, after curing the UV sealant, at least one of cutting the composite panel into a plurality of parts and painting the composite panel.

* * * * *